United States Patent

[11] 3,608,945

| [72] | Inventor | Charles T. Heitz<br>7200 S. E. 92nd Ave., Portland, Oreg. 97266 |
|---|---|---|
| [21] | Appl. No. | 808,816 |
| [22] | Filed | Mar. 20, 1969 |
| [45] | Patented | Sept. 28, 1971 |

[54] ARTICLE-HOLDING ASSEMBLY FOR USE WITH AN OPEN-TOP CONTAINER
1 Claim, 3 Drawing Figs.

[52] U.S. Cl. .................................................. 294/27, 220/97 B, 224/48 F
[51] Int. Cl. .................................................. A47j 45/00
[50] Field of Search .................................................. 294/27, 27 H; 220/97 B; 224/45.7, 48, 48.7; 208/83

[56] References Cited
UNITED STATES PATENTS

| 404,694 | 6/1889 | Eustis .................. | 294/27 X |
| 468,161 | 2/1892 | Thomas ............... | 294/27 X |
| 1,149,615 | 8/1915 | Batdorf ............... | 209/83 UX |
| 2,155,688 | 4/1939 | Schubel ............... | 224/48-7 |
| 2,944,722 | 7/1960 | Dahlhauser et al. .. | 220/97 (B) X |

FOREIGN PATENTS

| 649,817 | 12/1928 | France .................. | 220/97 B |

Primary Examiner—Richard E. Aegerter
Assistant Examiner—Douglas D. Watts
Attorney—Eugene M. Eckelman ABSTRACT: A tray having a pair of upright arms pivotally connected at their lower ends thereto. Each arm has an outwardly turned hook at its upper end adapted to engage the top edge of an open-top can for suspending the tray in the can. Each arm also has inturned hook at its upper end adapted to engage other trays for suspended connection thereto. The arms further have cross frame members for engagement by the inwardly turned hooks of other trays for suspending one tray from another in a container. The assembly may include one tray or a number of the trays one above the other in parallel relation. The trays have apertures therein allowing movement of heat, steam of liquid therethrough.

PATENTED SEP 28 1971  3,608,945
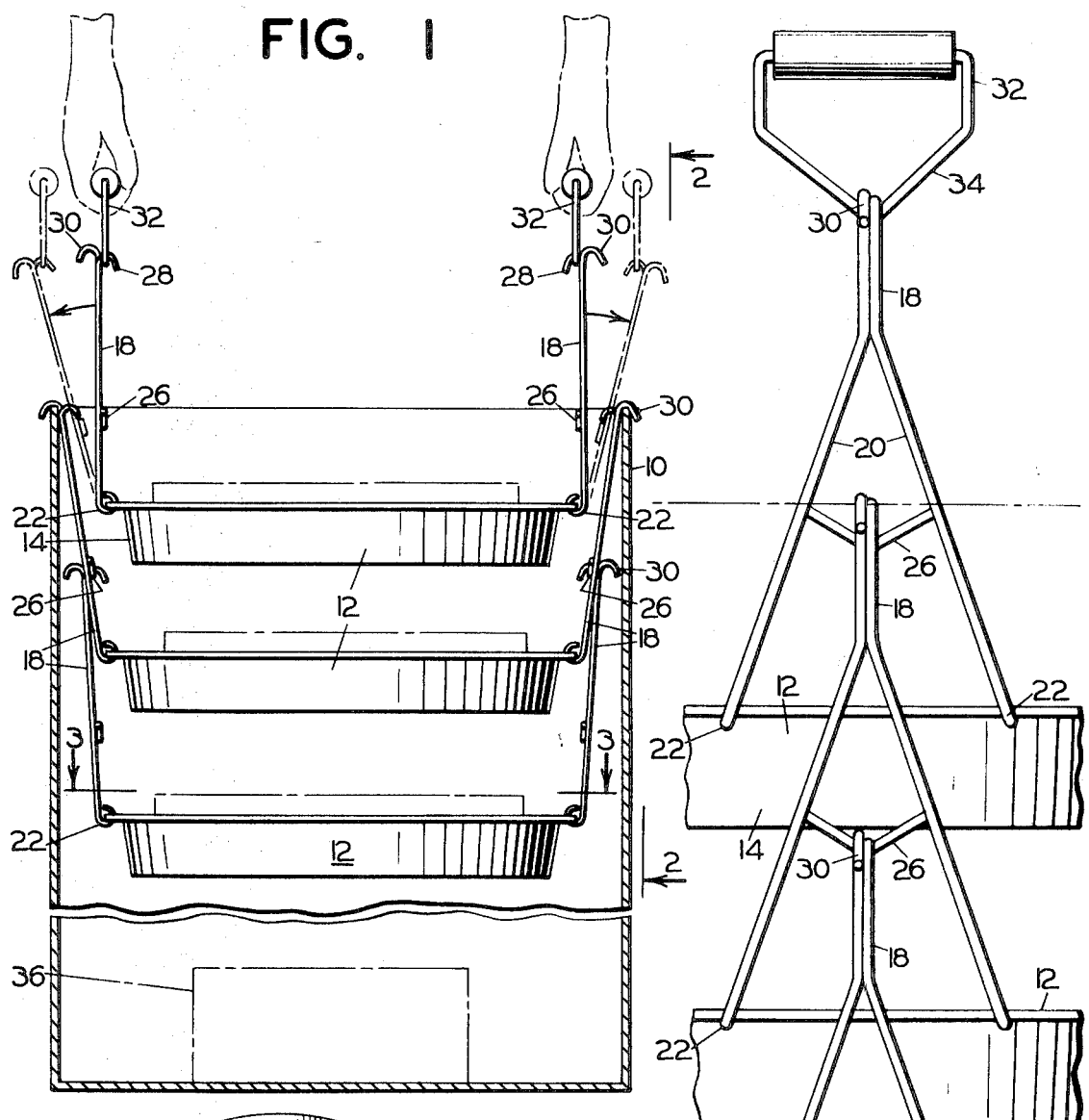
FIG. 1
FIG. 2
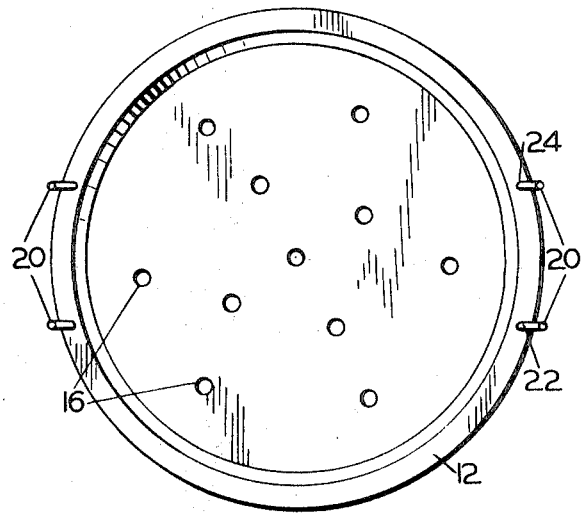
FIG. 3
CHARLES T. HEITZ
INVENTOR.
BY Eugene M. Eckelman
ATTY.

ARTICLE-HOLDING ASSEMBLY FOR USE WITH AN OPEN-TOP CONTAINER

BACKGROUND OF THE INVENTION

This invention relates to a new and novel article holding assembly for use with open top containers.

It is difficult problem in outdoor areas to warm food for crews of men who frequently move from one area to another. That is, to supply warm dinners to firefighting crews or to military groups, for example, it is not easy to keep a mobile kitchen in the area. Prior devices have not solved the problem of providing such food-warming apparatuses, at least ones which are readily transportable as well as efficient for heating food.

SUMMARY OF THE INVENTION

According to the invention and forming an important objective thereof a simplified arrangement of trays is provided wherein the trays are adapted to be suspended in an ordinary large container for heating food placed in the trays. More particularly, the invention comprises one or more trays each of which has structure capable of detachably suspending it from the top edge of a container and capable of holding other trays therebelow, and furthermore including structure which provides easy insertion and removal of one tray or the whole assembly from the container.

The invention will be better understood and additional objects and advantages will become apparent from the following description which illustrates a preferred form of the device.

BRIEF DESCRIPTION OF THE DRAWINGS

FIG. 1 is a side elevation view of a tray assembly embodying features of the present invention;

FIG. 2 is an enlarged fragmentary side elevational view taken on the line 2—2 of FIG. 1; and FIg. 3 is a horizontal sectional view taken on the line 3—3 of FIG. 1.

DESCRIPTION OF THE PREFERRED EMBODIMENT

With particular reference to the drawings, the present outdoor food-warming assembly is adapted for use with an open top container 10 of any suitable construction. The container 10 may for example comprise a conventional can such as those ordinarily used as garbage cans. Such a can is substantially inexpensive but at the same time rugged in use.

The present invention comprises a tray 12 having an upturned annular sidewall 14. Tray 12 is adapted to support meals, such as prepared dinners therein and has a plurality of apertures 16 in its bottom wall to permit permeation of heat and steam therethrough, as will be described more fully hereinafter.

The tray has a support arm 18 attached to each side thereof and each arm is A-shaped, having divergent frame members 20 secured together at the top. These arms have bottom eyes or hooks 22 attached in apertures 24 in the sidewall 14 of the tray. The hooked ends 22 have rotatable connection in the apertures 24 whereby the arms 18 can pivot relative to the tray.

Each of the arms 18 has a horizontally disposed crossbar or frame member 26 intermediate its upper and lower ends, and such crossbar has a V-shaped contour. Also, each of the arms 18 adjacent its upper end has an inturned hook 28 and an outturned hook 30, these hook members being substantially in the same plane.

Also associated with the present invention is a pair of ringlike handles 32 which are sufficiently large for grasping by the operator and which have a lower V-shaped end 34 for engaging hooks 28 or 30 as will now be described.

One or more of the trays can be supported in a container 10. For installing a single tray, the handle members 32 are first engaged with the inwardly turned hooks 28 of the arms 18 of the tray, as shown in FIG. 1, and the tray lowered into the container. As the tray is lowered into the container the arms are spread sufficiently to cause the outwardly turned hooks 30 to engage the top edge of the container. The handle members can then be unhooked from the inturned hooks 28 and the tray remains in suspended relation in the can.

If it is desired to install two or more of the trays within the container, additional trays are suspended from an uppermost tray by engagement of the inturned hooks 28 with the crossbars 26 of the next upper tray, also as shown in FIG. 1. Thus, in an installed position of a multiple-tray assembly, the uppermost tray hangs on the top edge of the can and each of the lower trays hangs on the crossbars 26 of the next upper tray.

To conveniently install multiple trays in the container, a first tray is installed in the container by engaging the handle members 32 with the inturned hooks 28 of the tray and then lowering the said tray into the container with the arms spread such that the out-turned hooks 30 engage the top edge of the can. Thereupon, the handles 22 are disengaged from the inturned hooks 28 of the mounted tray and engaged with the inturned hooks of a second tray which is to form a part of the assembly. This second tray is lowered into the container while at the same time pivoting the arms 18 toward each other so that they will clear parts of the first tray. This second tray is lowered to a point where the V-shaped frame members 26 of its arms are just below the inturned hooks 28 of the first tray.

Then the arms of the second tray are spread to cause hooking engagement of the V-shaped bars 26 of the second tray with the inturned hooks 28 of the first tray. The inward pivotal positioning of the arms 18 of a tray so that they will clear parts of a next lower tray is shown in full lines at the upper portion of FIG. 1 and the spreading position of said arms to cause hooking engagement between crossbars 26 and hooks 28 is shown in phantom lines. Such hooking engagement connects the two trays together for upward movement whereupon with the handles still engaged with the inturned hooks 28 of the second tray the assembly can be lifted slightly to disengage the out-turned hooks 30 of the first tray from the can. The arms 18 of the second tray are then pivoted inwardly which also pivot the arms 18 of the first tray inwardly whereby the assembly can be lowered to a point where the out-turned hooks 30 of the second tray can be hooked on the top edge of the can. The tray identified herein as the first tray will thus be under the tray identified as the second tray and will be suspended from the second tray.

By successively hooking the inturned hooks of the last installed tray on the V-shaped Bars 26 of other trays, any number of trays can be suspended in the can. If it is desired to remove the assembly one at a time, the handle members 32 are engaged with the inturned hooks 28 of the uppermost tray and the entire assembly lifted upwardly while at the same time pivoting the arms 18 of the uppermost tray toward each other. Such assembly is lifted to a point that the out-turned hooks 30 of the next lower tray can be hooked on the top edge of the can by spreading the arms 18 of the first tray outwardly and then lowering the assembly. After the hooks 30 of the said next tray hook on the top edge of the can, the uppermost tray can be released by lowering it slightly and pivoting the arms 18 inwardly to release the hooks 30 of the said next tray from the V-shaped bars 26 of the uppermost tray. The trays can all be taken out one at a time by the above procedure.

With the trays loaded with dinners, heat is supplied to the container by placing the latter over a suitable heater, shown in phantom in FIG. 1 and designated by the reference numeral 36, or over an open fire. Usually it is desired that the container contain water such that when said container is heated the dinners are steam heated. The holes 16 in the bottom of the trays permit fast permeation of heat and steam through the area where the food is held.

It is to be understood that the form of my invention herein shown and described is to be taken as a preferred example of the same and that various changes in the shape, size and arrangement of parts may be resorted to without departing from the spirit of my invention. For example, although the invention has been illustrated as a food warming assembly, it is obvious that it could be used for other purposes as well such as for cleaning parts, in which case the container could contain a cleaning fluid.

Having thus described my invention, I claim:

1. An article holding assembly for use with an open top container comprising
   a. a tray arranged to support articles,
   b. a pair of upright arms pivotally connected at their lower ends to opposite sides of said tray for lateral swinging movement,
   c. said arms being A-shaped having divergent frame members provided with horizontally disposed cross frame members,
   d. said cross frame members having a V-shaped contour,
   e. outwardly turned hook means on said arms,
   f. and inwardly turned hook means on said arms arranged to engage the V-shaped cross frame members of arms of other ones of said trays upon selected swinging of said arms on their pivots for suspending said tray from another of said trays which in turn is suspended from the top edge of a container for providing multiple suspension of the present trays in a container.